July 27, 1954  E. C. CROWTHER  2,684,703
LOCK NUT
Filed May 8, 1952  2 Sheets-Sheet 2
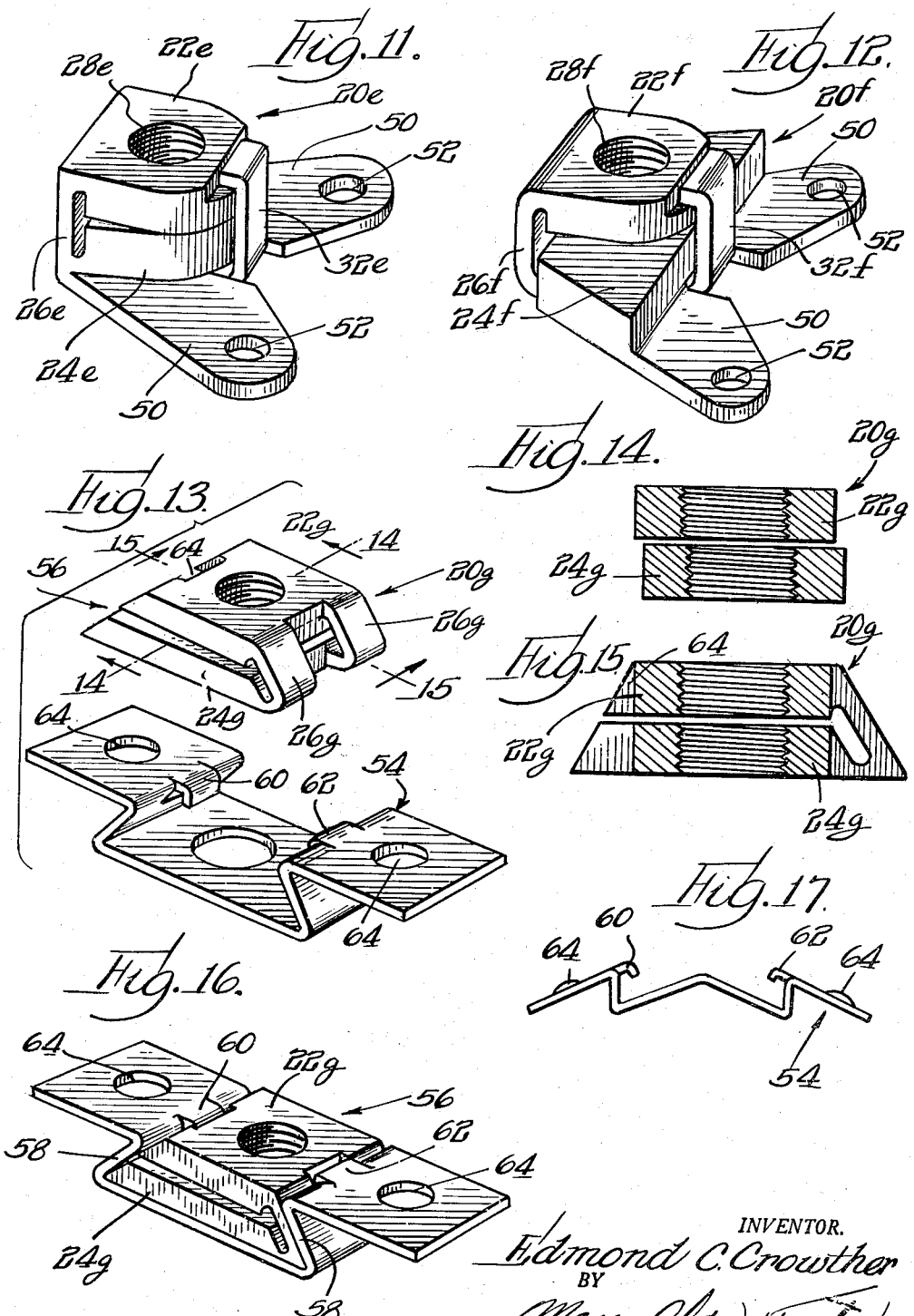
INVENTOR.
Edmond C. Crowther
BY
Moore, Olson & Trexler
attys.

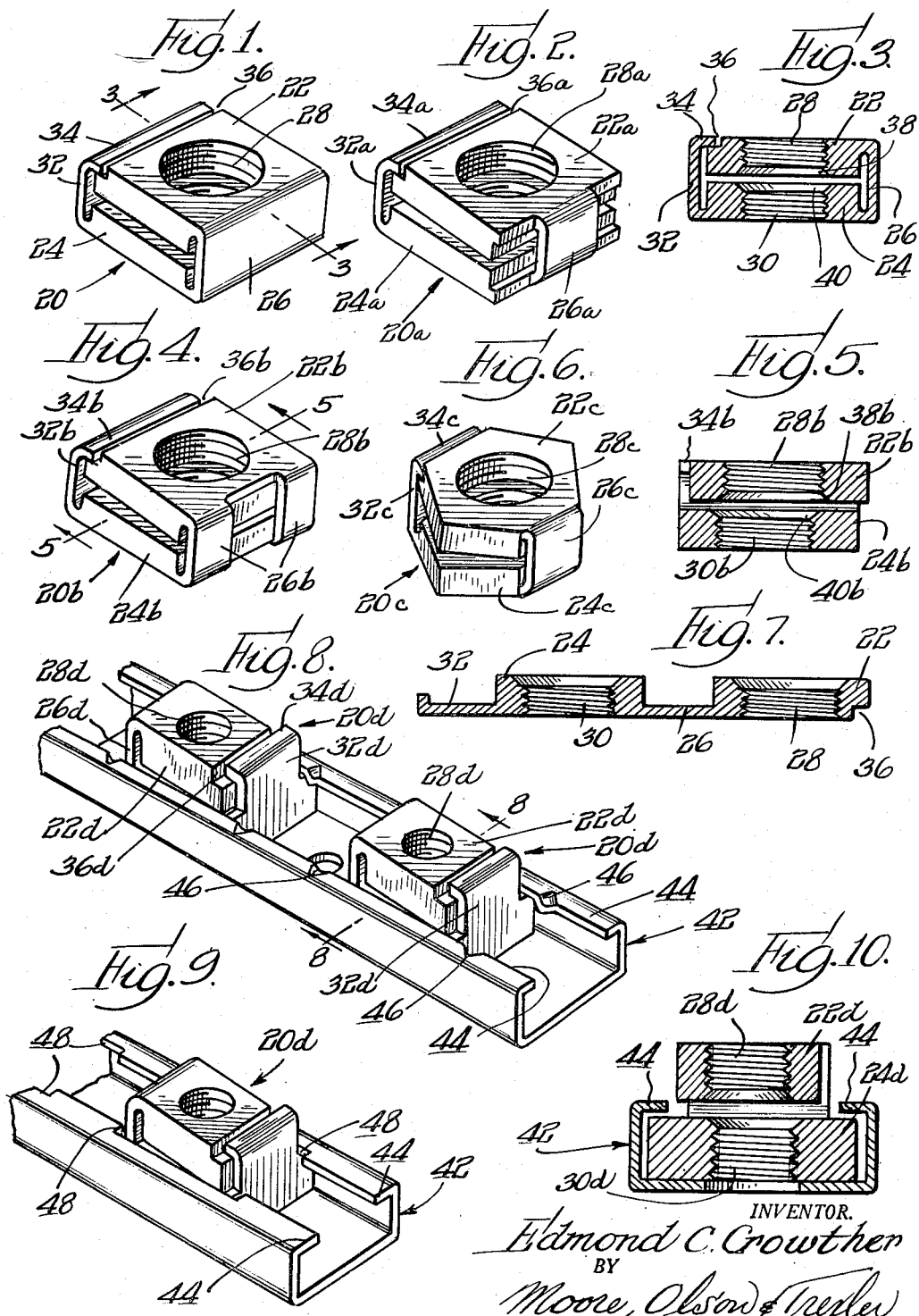

Patented July 27, 1954

2,684,703

UNITED STATES PATENT OFFICE 2,684,703

LOCK NUT

Edmond C. Crowther, Philadelphia, Pa., assignor to Illinois Tool Works, Chicago, Ill., a corporation of Illinois Application May 8, 1952, Serial No. 286,669

4 Claims. (Cl. 151—21)

This invention relates generally to lock nuts, and more particularly to lock nuts of the type wherein superimposed sections are normally offset so as to render the device self-locking when applied to a complementary screw member.

The present invention is concerned primarily with a lock nut of the type referred to above which constitutes a distinct improvement over lock nuts heretofore available. More specifically, the invention contemplates a self-locking one-piece nut structure wherein overlapping apertured plate-like members are relatively displaced transversely of the nut axis so as to position the screw accommodating helix in one member out of axial alignment with the complementary screw accommodating helix of the other member, said members being marginally coupled by a hinge structure and positively secured against axial separation at other marginal areas.

It is a further object of the present invention to provide a lock nut structure as set forth above wherein the device may be formed from a single strip of metallic stock of varying thicknesses, the thinner portion of the stock providing a hinge structure having the desired yieldability, an extension from one of the overlapping normally misaligned apertured members interlocking with the other member so as positively to secure these members against axial separation.

Another object of the present invention is to provide lock nuts of the type outlined above which are extremely simple in structure, very efficient in locking characteristics, and which may be produced very economically.

The present invention also contemplates a lock nut in which thread helices of substantial extent afford strength substantially equivalent to a conventional solid nut coupled with a relatively flexible or yieldable hinge connection which will facilitate relative displacement of the screw accommodating sections of the nut transversely with respect to the nut axis.

The foregoing and other objects and advantages will be more apparent from the following detailed description when considered in connection with the accompanying drawing wherein:

Fig. 1 is a perspective view of a lock nut which is representative of one embodiment of the present invention;

Fig. 2 is a perspective view similar to Fig. 1, showing a lock nut having a slightly modified hinge connection;

Fig. 3 is a central transverse sectional view taken substantially along the line 3—3 of Fig. 1;

Fig. 4 is a perspective view similar to Figs. 1 and 2, disclosing another embodiment of the present invention wherein the hinge connection constitutes a pair of yieldable hinge members;

Fig. 5 is a central transverse sectional view taken substantially along the line 5—5 of Fig. 4;

Fig. 6 is a perspective view of another embodiment of the present invention, showing the application of the invention to a hexagonal nut design as distinguished from the square design of Figs. 1 to 5 inclusive;

Fig. 7 is a central vertical sectional view of a preformed strip in which the thickened sections thereof may be folded into superimposing or overlapping relation, as shown in Fig. 3, with an integral extension of one of these sections bent into interlocking association with the other section so as to prevent axial separation of the sections;

Fig. 8 is a perspective view showing a pair of lock nuts of the present invention held in spaced relation within a channel member;

Fig. 9 is a perspective view similar to Fig. 8, disclosing the manner in which the lock nut may be secured in spaced relation within a channel by the use of notches provided within the inturned flanges of the channel;

Fig. 10 is a transverse sectional view taken substantially along the line 10—10 of Fig. 8 showing the manner in which the lock nut is embraced by the channel member;

Fig. 11 is a perspective view disclosing a still further modified form of the invention in the nature of an anchor nut wherein means is provided in association with one of the nut members for securing the device in a fixed position;

Fig. 12 is a perspective view of a form of the invention quite similar to the embodiment disclosed in Fig. 11, but differing therefrom in the arrangement of the lowermost section of the nut body;

Fig. 13 is a perspective exploded view of a modified form of the invention. In this embodiment the normally offset hingedly connected nut members or sections are held within a cage designed to be anchored, as by welding, to a work piece;

Fig. 14 is a sectional view taken substantially along the line 14—14 of Fig. 13;

Fig. 15 is a similar transverse sectional view taken substantially along the line 15—15 of Fig. 13;

Fig. 16 is a perspective view of the exploded parts in Fig. 13 joined together as a unitary structure; and Fig. 17 discloses a side view of the cage member of Figs. 13 and 16 prior to the application thereto of the lock nut.

Referring now to the drawings more in detail, wherein like numerals have been employed to designate similar parts throughout the various figures, it will be seen that one embodiment of the invention constitutes a lock nut designated generally by the numeral 20, Fig. 1. This lock nut 20 may be formed from a strip of non-uniform cross section, as shown in Fig. 7. The strip is made up of a pair of nut body members 22 and 24 which are connected by a hinge section 26. As shown in Fig. 1, the members 22 and 24 are brought into overlapping or superimposing relation and resiliently supported in this position by the hinge section 26. Each of the nut members 22—24 is provided with complementary threaded apertures 28—30 respectively, and particular attention is directed to the fact that the hinge section 26 is sufficiently yieldable to permit the nut members 22—24 to be relatively displaced transversely of the nut axis so as normally to position the screw accommodating helix or thread in one of the nut members out of axial alignment with the complementary screw accommodating helix or thread of the other member.

In order to secure the free extremity of the nut member 22 against axial separation from the member 24, an extension or tab 32 formed integral with the nut member 24 is bent or folded so as to cause a flange 34 along the free margin of the tab 32 to interlock with a complementary recess or groove 36 extending along the free margin of the nut member 22. In this position the outer surface of the flange 34 lies substantially flush with the adjacent outer surface of the nut member 22 and provides positive assurance against axial displacement of the free margin of the member 22 with respect to the nut member 24. By positioning the flange 34 within the recess or groove 36 it will be appreciated that a two-way nut is provided or in other words a nut is provided which may have either end thereof indiscriminantly applied to a screw since the flange 34 does not project beyond the clamping surface or end face of the nut member 22.

By providing a relatively thin hinge section 26, as described, as distinguished from the relatively thick nut members 22—24, sufficient resiliency is attained in the vicinity of the hinge readily to permit the above mentioned relatively transverse displacement of the nut members 22—24. This transverse shifting of the nut members serves to disalign the complementary threaded apertures 28—30 so that when the nut is applied to a complementary screw member, not shown, the thread helices in both nut members are brought into alignment. In this aligned position the resilient or yieldable hinge section 26 sets up strong forces urging the nut sections to return to their normal misaligned relation, thereby causing the nut member frictionally to grip the thread convolutions of the complementary screw member. It should be noted that the hinge and the tab 32 are oppositely and parallelly disposed and that the nut members are offset in a direction extending generally parallel to the hinge 26 and tab 32. With this arrangement the tab 32 and flange 34 do not interfere with the relative transverse movement between the nut members. As the nut is applied to a complementary screw member the extremity of the screw after passing through the threaded aperture of the first nut member is brought into association with the threaded aperture of the other nut member. In order to facilitate ultimate registration of the threaded aperture in the second nut member, each of said nut members 22—24 have been provided with flared openings 38—40 respectively. These flared or chamfered openings serve to lead the entering screw member into the complementary threaded opening of the nut member and thus facilitate bringing the two threaded nut apertures into axial alignment.

It will also be apparent that as the extremity of a complementary screw member approaches the second aperture of the nut, the abutment of the screw with the second nut member may have a tendency to urge said member away from the first member. It is under these conditions that the flange 34 resting within the complementary groove 36 of the nut member 22 serves to prevent separation of the nut members 22—24.

It will also be apparent from the foregoing description that the nut 20, because of the oppositely disposed flat surfaces presented by the hinge section 26 on one side and the tab or extension 32 on the other side, together with the diametrically and oppositely disposed peripheral surfaces presented by the relatively thick nut members 22—24, greatly facilitates the ease with which the lock nut may be gripped for turning. The relatively thick body members 22—24 of the nut make it possible to employ thread convolutions or helices of substantial extent so that in the aggregate the two nut bodies provide axial strength which is comparable to the strength in a standard solid nut designed for similar use. In other words, a nut constructed in accordance with the teachings of the present invention not only presents substantially the same strength as a corresponding solid nut, but also affords effective self locking characteristics without any danger of axial separation of the overlapping or superimposed threaded nut members.

In Fig. 2 a lock nut, designated generally by the numeral 20a, is disclosed, which corresponds structurally in every detail with respect to the nut 20 previously described, with the exception of the hinge section 26a, which is narrower than the hinge section 26 of full nut width. All of the elements of the nut 20a which correspond with like elements of the nut 20 have been designated by similar numerals bearings the suffix a. There are instances where a hinge section of less strength than the previously described hinge section 26 should be employed. Thus by reducing the width of the hinge, as illustrated by the hinge section 26a of Fig. 2, the required degree of strength or resiliency may be obtained.

Likewise in Fig. 4, where a lock nut designated generally by the numeral 20b is shown, a pair of hinge sections 26b perform the same function as the previously described hinge sections 26 of Fig. 1 and 26a of Fig. 2. Certain applications are best served by having a pair of spaced hinge members as distinguished from the full width hinge 26 of Fig. 1, or the single centrally disposed hinge 26a of reduced width, as shown in Fig. 2. In all other respects, as indicated by the corresponding numerals bearing the suffix b, the nut 26b conforms structurally with the lock nuts 20 and 20a.

In Fig. 6 a still further modified lock nut is shown, and this nut is designated generally by the numeral 20c. The nut 20c has all of the essential structural characteristics of the previously described lock nuts 20—20a—20b. It differs only in form in that the lock nut 20c is hexagonal in shape as distinguished from the square shape of the previously described lock nuts. All of the elements of the lock nut 20c have been given corresponding designating numerals bearing the suffix c.

In Figs. 8 to 10 inclusive, the application of the previously described lock nuts to channel members is shown. Thus, in Fig. 8, lock nuts designated generally by the numeral 20d are shown in association with a channeled work piece 42. The only structural difference between the lock nut 20d and the previously described lock nut 20 is that the nut member 22d, corresponding to the previously described nut member 22, is less in width than its companion or complementary nut member 24d. This enables the inturned flanges 44 of the channeled work piece 42 to overlie the upper surface of the nut member 24d, as clearly illustrated in Fig. 10. Indentations or detents 46 formed along the inturned flanges 44 serve to prevent shifting of the lock nuts 22 longitudinally of the work piece. In Fig. 9 the lock nut 20d is secured against movement longitudinally of the work piece 42 by oppositely disposed notches 48 provided within the inturned flanges 44.

In Figs. 11 and 12, the application of the previously described lock nut to anchor type nuts is disclosed. The device in Fig. 11 is designated generally by the numeral 20e, and the device in Fig. 12 by the numeral 20f. The only structural difference between the device 20f and 20e resides in the fact that the nut member 24f is substantially wider than the corresponding nut member 24e of Fig. 11. Each of the lock nuts 20e—20f is provided with extensions 50 which are provided with apertures 52 to accommodate suitable fastening members such as rivets, screws and the like. Like the lock nuts previously described, the threaded apertures of the lock nuts 20e—20f are normally displaced transversely with respect to the nut axis. It will be apparent from the numerals applied to the various structures of the nuts 20e—20f that these lock nuts correspond functionally and structurally with the previously described lock nuts.

In Figs. 13 to 17 inclusive, the applicability of the invention to cage nuts is shown. A cage nut as commonly referred to is a fastening device in which the nut structure is retained within or embraced by a member known as a cage. This cage in some instances is designed for attachment to a work piece, and thus holds a nut carried thereby in proper relation with respect to a complementary aperture in a work piece. One embodiment of this cage nut design is illustrated in Figs. 13 and 16 wherein the lock nut designated generally by the numeral 20g is combined with a sheet metal cage, designated generally by the numeral 54, so as to present a complete preassembled cage nut structure designated generally by the numeral 56. The lock nut 20g, like the previously described lock nuts, includes a pair of superimposed or overlapping nut members 22g and 24g. These nut members are connected by resilient hinge sections 26g, and the nut members 22g—24g are relatively displaced transversely of the nut axis to provide the self locking characteristics previously described in connection with the other lock nuts. It will be noted that the side of the nut members which carries the hinge sections 26g and the opposite free edges of the nut sections are inclined or chamfered so as to enable the nut to fit into and be held in position by complementary dovetailed sections 58 of the cage 54. Fingers or lugs 60 and 62 interlock respectively with a notch 64 on one side of the nut 20g and the recess extending between the hinge sections 26g on the opposite side of the nut. These fingers 60—62 serve to secure the lock nut from shifting relative to the cage 54 in one direction just as the dovetailed sections 56 of the cage prevent relative shifting of the nut and cage longitudinally of the cage. The complementary dovetail construction of the nut and cage member also serves to prevent axial separation of the lock nut members 22g—24g.

It has been found practical in assembling the lock nut 20g with the cage 54 to first form the central portion of the cage as shown in Fig. 17. It will be seen from this disclosure that the central body of the cage is bent so as to separate the lugs 60—62 sufficiently to permit the insertion of the nut therebetween. After the nut has been inserted the central bent portion of the body may be flattened so as to bring the lugs 60—62 into interlocking association with opposite margins of the nut body. It will also be noted that the cage is provided with sections 64 to facilitate welding the cage to a work piece. Obviously, the cage may be secured by other means, such as rivets or screws, not shown.

From the foregoing it will be apparent that the present invention contemplates a lock nut structure of improved practical design. Offsetting the complementary apertured nut bodies joined by an integral hinge member of the type described assures positive locking when the nut is applied to a complementary screw member. It will also be clear from the foregoing description that the aforesaid efficiently operable nut members are secured positively against axial separation at all times.

While for purposes of disclosure certain structural forms have been illustrated in the drawings, it will be apparent that other modifications and changes may be made without departing from the spirit and scope of the appended claims.

The invention is hereby claimed as follows:

1. A lock nut including a pair of superposed relatively thick and rigid apertured plate-like nut members, each of the apertures in said nut members being defined by complementary screw accommodating helices, a relatively easily deformable resilient hinge section of thinner cross section than the thickness of said nut members and integrally connecting adjacent margins of said nut members, said members being relatively displaced transversely of the nut axis so as normally to position the screw accommodating helix in one nut member out of axial alignment with the screw accommodating helix of the other nut member, and an integral tab means oppositely disposed from said hinge section and extending from one of said nut members and terminating in a flange interlocking with the other of said nut members, said flange overlying a marginal portion of the other of said nut members and being completely out of registration with said apertures to avoid any contact with a complementary screw member applied to the nut, said other of said nut members having an end face thereof provided with a marginal recess opposite the hinge section, and said flange being located within said marginal recess and substantially entirely axially within said end face, whereby both ends of the nut may be utilized as a clamping surface.

2. A lock nut as claimed in claim 1, wherein adjacent inner ends of said apertures are provided with flared openings to facilitate application of a screw member to the nut in both directions.

3. A lock nut as claimed in claim 1, wherein the hinge section is of a width less than the width of said nut members to predetermine the resiliency in the hinge connection between said nut members.

4. A lock nut as claimed in claim 1, wherein one of said nut members has a transverse width greater than the other of said nut members to present laterally projecting surfaces on the wider nut member.

References Cited in the file of this patent

UNITED STATES PATENTS

| Number | Name | Date |
|---|---|---|
| 704,162 | Wilson | July 8, 1902 |
| 1,033,778 | Bonness | July 30, 1912 |
| 1,087,275 | Chesher | Feb. 7, 1914 |
| 1,400,545 | Hleb | Dec. 20, 1921 |
| 1,812,492 | Lee | June 30, 1931 |
| 2,443,066 | Breedlove | June 8, 1948 |

FOREIGN PATENTS

| Number | Country | Date |
|---|---|---|
| 28,592 | Great Britain | Dec. 11, 1912 |